United States Patent
Sobol et al.

(10) Patent No.: US 11,847,343 B2
(45) Date of Patent: Dec. 19, 2023

(54) STORAGE SYSTEM AND METHOD FOR NON-BLOCKING COHERENT RE-WRITES

(71) Applicant: Western Digital Technologies, Inc., San Jose, CA (US)

(72) Inventors: Eyal Sobol, Givat Shmuel (IL); Karin Inbar, Kfar Saba (IL); Avi Shchislowski, Kadima (IL); Yuliy Izrailov, Rishon LeZion (IL)

(73) Assignee: Western Digital Technologies, Inc., San Jose, CA (US)

( * ) Notice: Subject to any disclaimer, the term of this patent is extended or adjusted under 35 U.S.C. 154(b) by 230 days.

(21) Appl. No.: 17/559,327

(22) Filed: Dec. 22, 2021

(65) Prior Publication Data

US 2023/0195359 A1    Jun. 22, 2023

(51) Int. Cl.
G06F 3/06    (2006.01)

(52) U.S. Cl.
CPC .......... G06F 3/0655 (2013.01); G06F 3/0604 (2013.01); G06F 3/0679 (2013.01)

(58) Field of Classification Search
CPC ....... G06F 3/0619; G06F 3/0647; G06F 3/065
See application file for complete search history.

(56) References Cited

U.S. PATENT DOCUMENTS

| | | | |
|---|---|---|---|
| 5,761,680 A * | 6/1998 | Cohen | G06F 3/0643 |
| 7,409,522 B1 | 8/2008 | Fair et al. | |
| 7,721,059 B2 | 5/2010 | Mylly et al. | |
| 8,051,265 B2 | 11/2011 | Lee et al. | |
| 8,190,811 B2 | 5/2012 | Moon et al. | |
| 8,626,987 B2 | 1/2014 | Jung et al. | |
| 8,819,375 B1 | 8/2014 | Pruett et al. | |
| 8,990,477 B2 | 3/2015 | Parker et al. | |
| 9,355,027 B2 | 5/2016 | Park et al. | |
| 9,542,307 B2 | 1/2017 | Karp | |
| 9,645,742 B2 | 5/2017 | Duzly et al. | |
| 10,140,067 B1 | 11/2018 | Horn et al. | |
| 10,402,114 B2 | 9/2019 | Ogawa | |

(Continued)

FOREIGN PATENT DOCUMENTS

| | | | |
|---|---|---|---|
| JP | 2002268924 A | 9/2002 | |
| JP | 2003186709 A | 7/2003 | |

(Continued)

OTHER PUBLICATIONS

Non-final Office Action dated Aug. 2, 2023 for U.S. Appl. No. 17/558,014, eleven pages.

(Continued)

*Primary Examiner* — David Yi
*Assistant Examiner* — Nicholas A. Paperno
(74) *Attorney, Agent, or Firm* — Crowell & Moring LLP

(57) ABSTRACT

A host sends a storage system a command to read data from a memory and then a command to write the data back to the memory to defragment the data. The host sends flags along with the commands. The flag sent with the read command causes the storage system to take a snapshot of the logical-to-physical address map relevant to the data. The flag sent with the write command causes the storage system to compare the snapshot with the current version of the logical-to-physical address map and write the data back to the memory only if there is a match.

20 Claims, 7 Drawing Sheets

(56) References Cited

U.S. PATENT DOCUMENTS

| | | |
|---|---|---|
| 10,559,619 B2 | 2/2020 | Nakamizo |
| 10,572,379 B2 | 2/2020 | Guo et al. |
| 10,599,619 B2 | 3/2020 | Stouder-Studenmund et al. |
| 2008/0077762 A1 | 3/2008 | Scott |
| 2011/0055430 A1 | 3/2011 | Chen |
| 2013/0173842 A1 | 7/2013 | Ng et al. |
| 2013/0226881 A1 | 8/2013 | Sharma |
| 2014/0189264 A1 | 7/2014 | George |
| 2014/0189266 A1 | 7/2014 | Sharma |
| 2014/0229657 A1 | 8/2014 | Karamov et al. |
| 2016/0062664 A1 | 3/2016 | Samuels |
| 2016/0283160 A1 | 9/2016 | Trika |
| 2017/0083261 A1 | 3/2017 | Seo et al. |
| 2017/0192710 A1* | 7/2017 | Pundir ................ G06F 3/0644 |
| 2018/0359227 A1* | 12/2018 | Trantham ............ G06F 21/6218 |
| 2019/0286369 A1* | 9/2019 | Liu ...................... G06F 3/0679 |
| 2020/0401557 A1 | 12/2020 | Struyve et al. |

FOREIGN PATENT DOCUMENTS

| | | |
|---|---|---|
| JP | 2005208697 A | 8/2005 |
| JP | 2010020641 A | 1/2010 |
| JP | 2010522400 A | 7/2010 |
| JP | 2015513741 A | 5/2015 |
| JP | 2016515231 A | 5/2016 |
| JP | 2018060321 A | 4/2018 |

OTHER PUBLICATIONS

Office Action dated Feb. 28, 2023 for U.S. Appl. No. 17/558,089.
"What is Flash-Friendly File System (F2FS)?"; The Linux Kernel Archives; downloaded from the Internet at https://www.kernel.org/doc/Documentation/filesystems/f2fs.txt on Dec. 21, 2021; 12 pages.
U.S. Appl. No. 17/215,898, filed Mar. 29, 2021.

* cited by examiner

READ (10) Command

| Bit / Byte | 7 | 6 | 5 | 4 | 3 | 2 | 1 | 0 |
|---|---|---|---|---|---|---|---|---|
| 0 | OPERATION CODE (28h) ||||||||
| 1 | RDPROTECT = 000b ||| DPO | FUA | Reserved | FUA_NV = 0b | Obsolete |
| 2 | (MSB) LOGICAL BLOCK ADDRESS |||||||  |
| 3 |  |||||||  |
| 4 |  |||||||  |
| 5 |  ||||||| (LSB) |
| 6 | Reserved ||||| GROUP NUMBER |||
| 7 | (MSB) TRANSFER LENGTH |||||||  |
| 8 |  ||||||| (LSB) |
| 9 | CONTROL = 00h ||||||||

FIG. 5

WRITE (10) Command

| Bit<br>Byte | 7 | 6 | 5 | 4 | 3 | 2 | 1 | 0 |
|---|---|---|---|---|---|---|---|---|
| 0 | | | | OPERATION CODE (2Ah) | | | | |
| 1 | WRPROTECT<br>= 000b | | | DPO | FUA | Reserved | FUA_NV<br>= 0b | Obsolete |
| 2 | (MSB) | | | LOGICAL BLOCK ADDRESS | | | | |
| 3 | | | | | | | | |
| 4 | | | | | | | | |
| 5 | | | | | | | | (LSB) |
| 6 | Reserved | | | | | | GROUP NUMBER | |
| 7 | (MSB) | | | TRANSFER LENGTH | | | | |
| 8 | | | | | | | | (LSB) |
| 9 | | | | CONTROL = 00h | | | | |

STORAGE SYSTEM AND METHOD FOR NON-BLOCKING COHERENT RE-WRITES

Background

Fragmentation of a memory of a storage system can reduce performance of the storage system. Such fragmentation can occur when a host writes an update to a file previously stored in the memory. Over time, the level of fragmentation can increase, resulting in an increased degradation of performance. In order to increase the performance of the storage system, electronic devices, such as personal computers, can perform a file system defragmentation operation if logical addresses of files are fragmented.

BRIEF DESCRIPTION OF THE DRAWINGS

FIG. 5 is an illustration of a read command of an embodiment.

FIG. 6 is an illustration of a write command of an embodiment.

DETAILED DESCRIPTION

The following embodiments generally relate to a storage system and method for non-blocking coherent re-writes. In one embodiment, a storage system is presented comprising a memory and a controller. The controller is configured to receive a read command from a host to read data stored at a logical block address and, in response, read the data from the memory and store a representation of a portion of a logical-to-physical address table that contains an entry for the logical block address. The controller is further configured to receive a write command from the host to write the data back to the memory and, in response, compare the representation with a current version of the portion of the logical-to-physical address table that contains the entry for the logical block address and write the data back to the memory only in response to the representation matching the current version.

In another embodiment, a method is provided that is performed in a host in communication with a storage system comprising a memory. The method comprises: sending a read command to the storage system to read data at a logical block address, wherein the read command comprises a first flag configured to cause the storage system to take a snapshot of a segment of a logical-to-physical address table that is relevant to the logical block address; and sending a write command to the storage system to write the data back to the memory, wherein the write command comprises a second flag configured to cause the storage system to compare the snapshot with a current version of the segment of the logical-to-physical address table and write the data back to the memory only in response to the snapshot matching the current version.

In yet another embodiment, a storage system is provided comprising a memory and means for executing a received write command to write data back to the memory after the data was previously read from the memory, wherein the data is written back to the memory only in response to a portion of a logical-to-physical address table that contains an entry for a logical block address fur the data being unchanged from when the data was read from the memory. Other embodiments are provided and can be used alone or in combination.

Figure 1A:
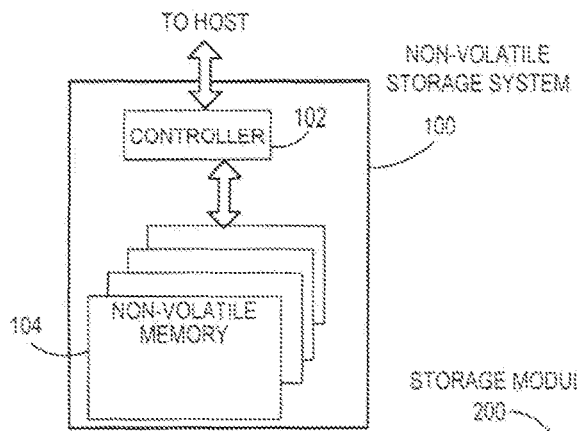
FIG. 1A is a block diagram of a non-volatile storage system of an embodiment.
Figure 1B:
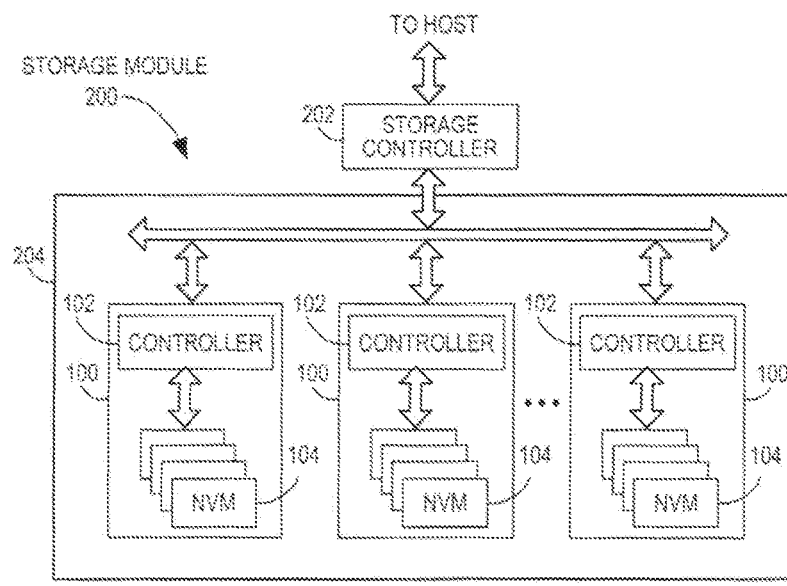
FIG. 1B is a block diagram illustrating a storage module of an embodiment.
Figure 1C:
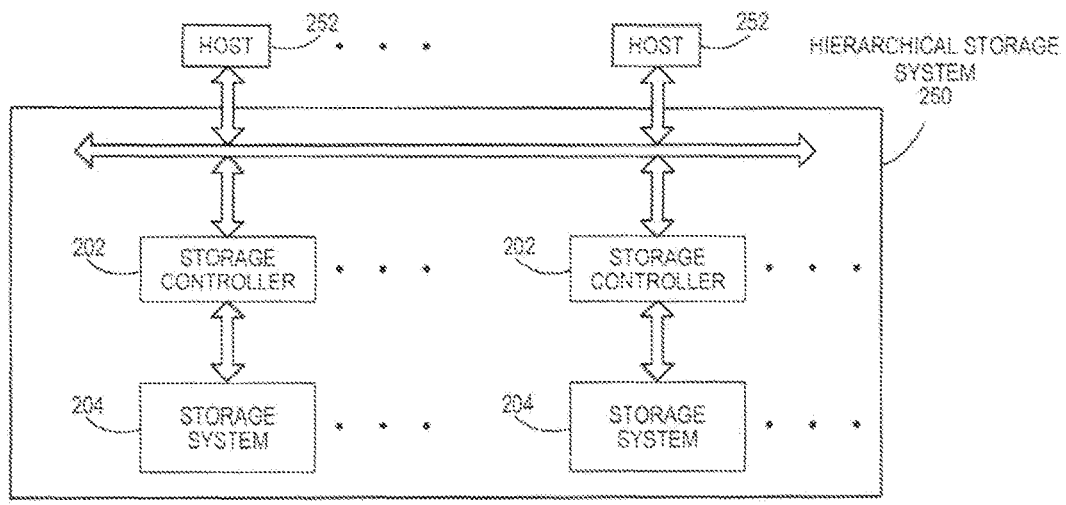
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magneto-resistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used, Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory cells that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including ReRAM, MRAM, PCM, NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), quad-level cell (CLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card-based system, such as a secure digital (SD) or a micro secure digital (micro-SD) card (or USB, SSD, etc.). In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
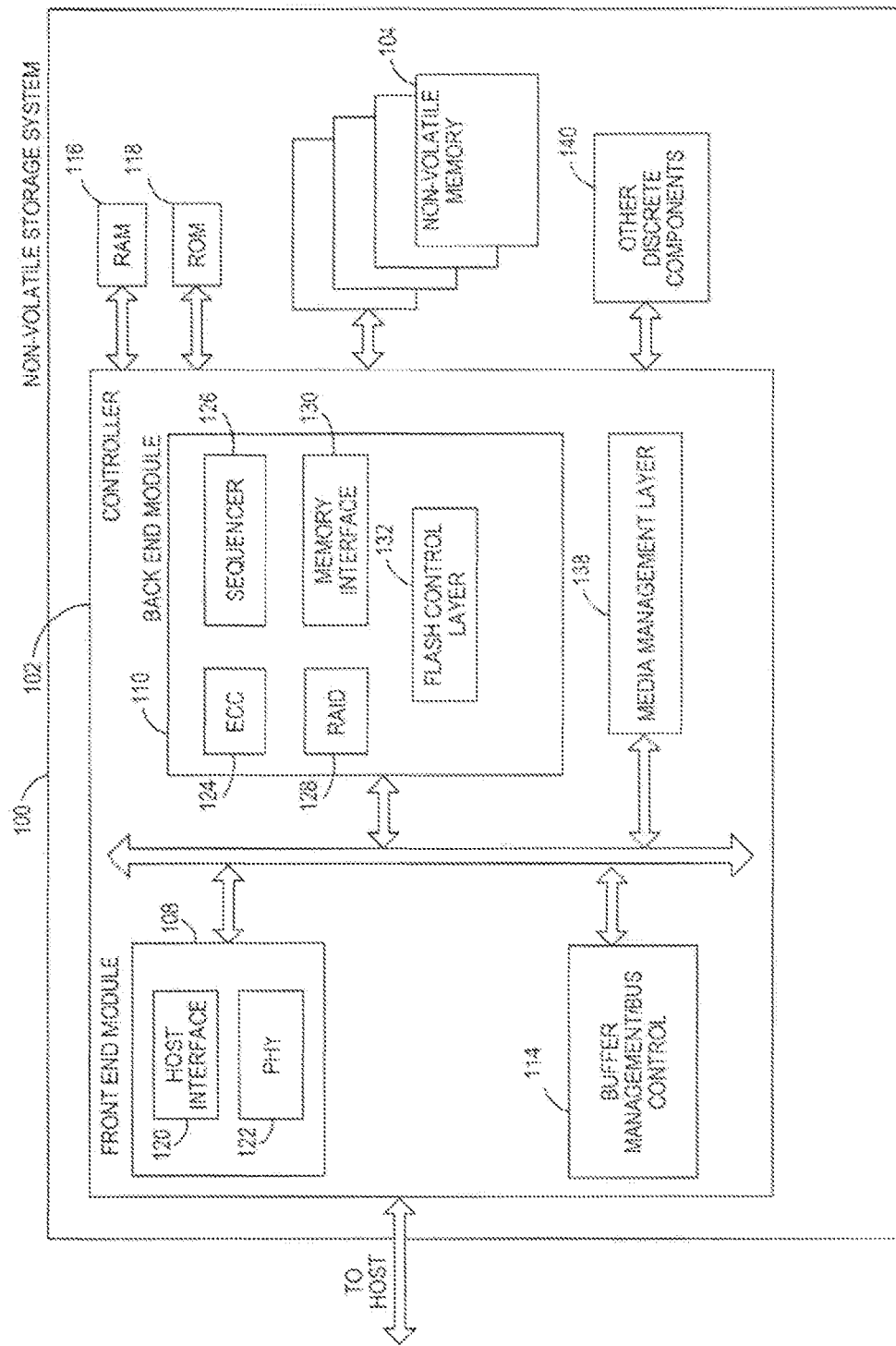
FIG. 2A is a block diagram illustrating components of the controller of the non-volatile storage system illustrated in FIG. 1A according to an embodiment.
Figure 2B:
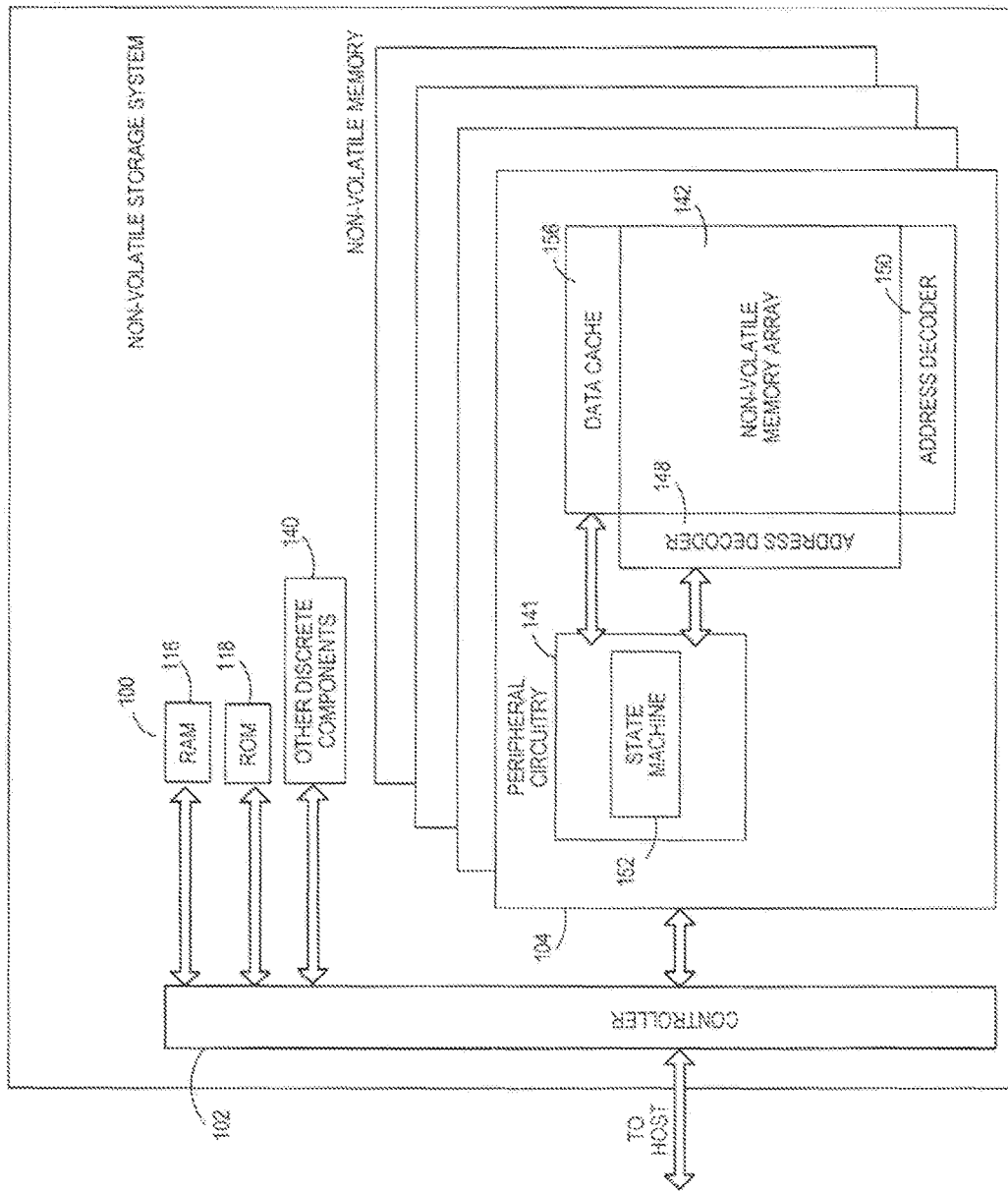
FIG. 2B is a block diagram illustrating components of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

FIG. 213 is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will he referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may he needed because the memory 104 may have limited endurance, may only be written in multiples of pages, and/or may not be written unless it is erased as a block of memory cells. The FTL understands these potential limitations of the memory 104, which may not be visible to the host. Accordingly, the FTL attempts to translate the writes from host into writes into the memory 104.

The FIT may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
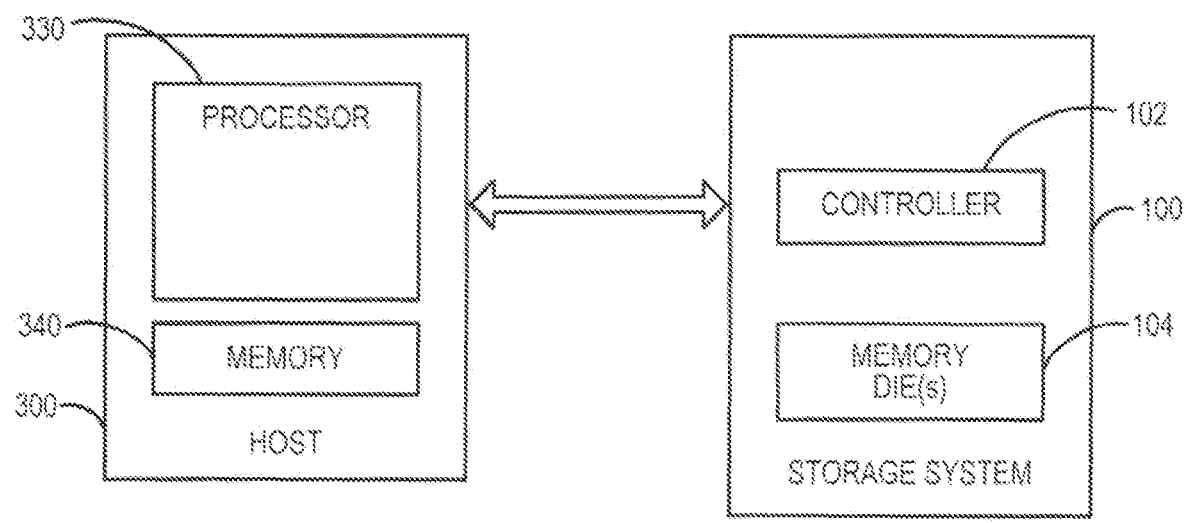
FIG. 3 is a block diagram of a host and a storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340 (e.g., DRAM)) to the storage system 100 for storage in the storage system's memory 104 (e.g., non-volatile memory dies). While the host 300 and the storage system 100 are shown as separate boxes in FIG. 3, it should be noted that the storage system 100 can be integrated in the host 300, the storage system 100 can be removably connected to the host 300, and the storage system 100 and host 300 can communicate over a network. It should also be noted that the memory 104 can be integrated in the storage system 100 or removably connected to the storage system 100.

As mentioned above, fragmentation of the storage system's memory can reduce performance of the storage system. The host may use a "copy" operation to reduce the amount of physical fragmentation in the memory. This is referred to as defragmentation (or "defrag"). In this copy operation, the host reads data from the storage system's memory (from non-sequential physical addresses) and writes the data back to the memory 104 (in sequential physical addresses). When performing the copy operation in a user space application, the copy operation would bypass the host's file system. However, doing so runs the risk of a host application modifying or invalidating data during the vulnerable time period between the read and write operations. To avoid this, the host can run the copy operation through its host file system in order to maintain data coherency, as the host file system would lock the relevant data during the copy operation. But modifying the file system in order to support this process might be challenging if the file system is written as open source code and is not controlled by manufacturer's vendors. Moreover, as the host is not aware of the storage system's internal logical-to-physical address mapping and page structure, the host may also copy unneeded pages and, thus, not only reduce performance but also increase write amplification.

The following embodiments provide a non-blocking coherent re-write process aimed at maintaining host and storage system logical block address and physical block address mapping coherency, thereby maintaining high read performance and low write amplification. These embodiments can be used on a user-space level and without using file system internal functions or changing the host image. The host and storage system non-blocking coherent re-write process can be implemented by joint synchronized processes at the host processor 330 and the storage system controller 102.

In general, the host 300 triggers a re-write process that reads data from the memory 104 (which may be fragmented in the memory space) and writes the data back to the storage system 100 for storage in the memory 104. In one example, the read/write command is a fixed size (e.g., 128 KB or 192 KB), although other and/or variable sizes can be used. The re-written data is guaranteed to be written in consecutive physical addresses in the memory 104 and, hence, reading the data out of the memory 104 at a later time will be highly efficient. In one example, the host 300 sends special read and write flags for the storage system 100 to use as described below.

When the storage system 100 receives the non-blocking coherent read command flag from the host 300, the controller 102 creates and stores a snapshot of the logical-to-physical address table segment related to the special read access. Next, when a write command with the non-blocking coherent re-write process flag is received, the controller 102 checks the current logical-to-physical address table and the stored snapshot of the logical-to-physical address table. If the two segments match, the data was not re-written by the host 300, and the re-write will be performed. However, if a mismatch is found, the data was already re-written by the host 300, and the controller 102 can skip writing it (so, there would be no need to update the logical-to-physical address tables). This comparison methodology enables the storage system 100 to maintain data coherency without performing a full data comparison that comes with major performance and resources implications.

These embodiments can be used to guarantee that host re-write process coherency is maintained by the storage system 100 and also that data is arranged efficiently in the memory 104, which reduces write amplification and keeps the read performance high (since data is not physically fragmented). In addition, in case the copy operation is used for defragmentation, for every defragmentation write command (e.g., with a size of 128 KB), the operation can be conditional not only on the check described above (verifying that the current mapping of logical block addresses has not been changed between the defragmentation read and write commands) but also by a check that the physical pages being copied are indeed physically fragmented. Otherwise, the controller 102 can ignore the write command, thus avoiding redundant copy operations, which improves performance and reduces write-amplification.

Figure 4:
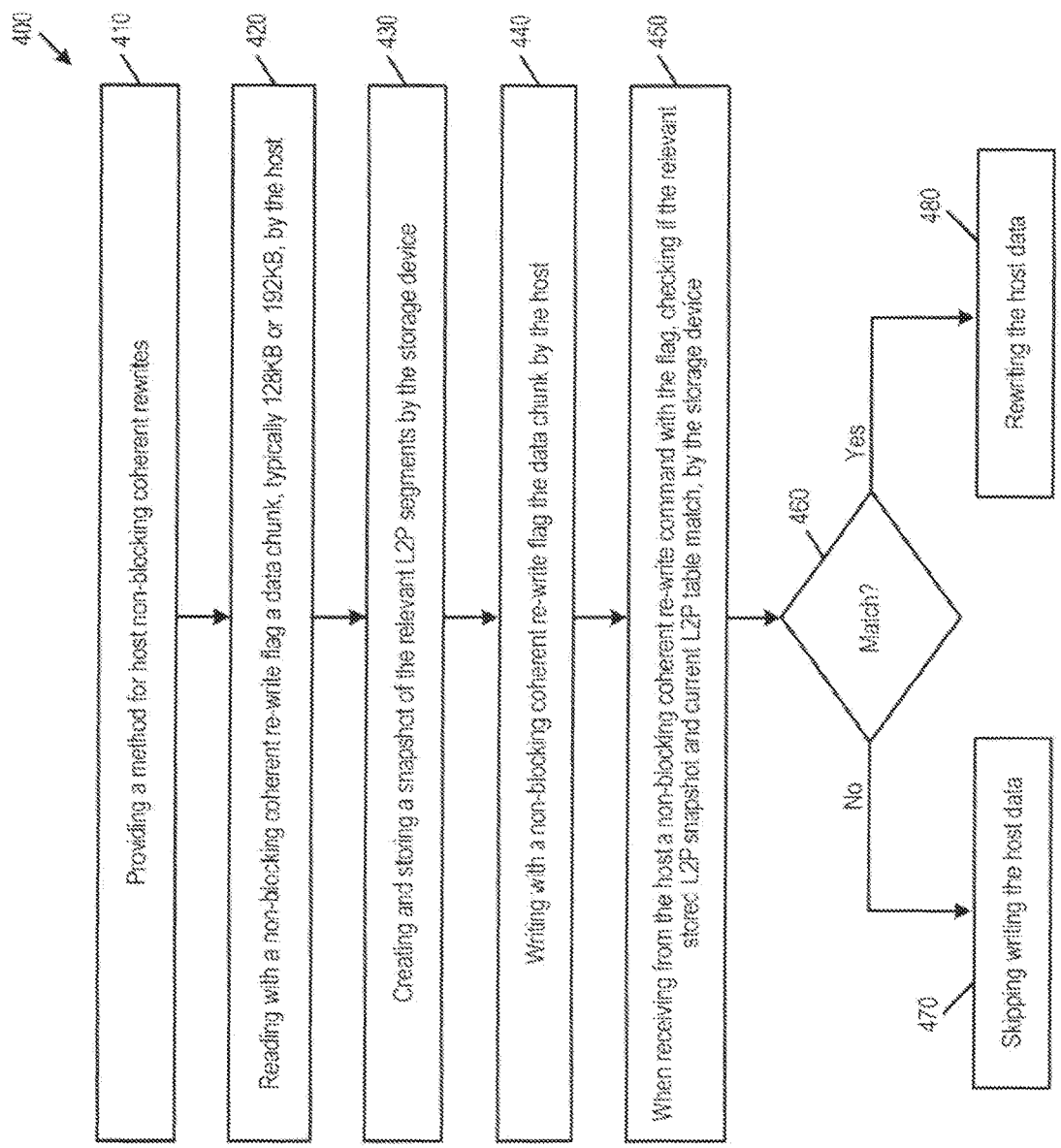
FIG. 4 is a flow chart of a method of an embodiment for non-blocking coherent re-writes.

Turning again to the drawings, FIG. 4 is a flow chart 400 that illustrates these acts. As shown in FIG. 4, this embodiment provides a method for host non-blocking coherent re-writes (act 410). In this method, the host 300 sends the storage system 100 a read command followed by a write command to copy data from one part of the memory 104 to another (e.g., to perform defragmentation). More specifically, in this embodiment, the host 300 sends a read command to the storage system 100 to read a data chunk (e.g., 128 KB or 192 KB) from the memory 104, where the read command contains a non-blocking coherent re-write flag (act 420). Next, the controller 102 checks and stores a snapshot of the relevant logical-to-physical address table segments (act 430). The host 300 then writes with a non-blocking coherent re-write flag the data chunk (act 440). The controller 102 then checks if the relevant stored logical-to-physical address snapshot and the current logical-to-physical address table match (acts 450 and 460). If they do not match, the controller 102 skips writing the host data (act 470). However, if they do match, the controller 102 re-writes the host data in the memory 104 (act 480).

It should be noted that the read/write flags can take any suitable form. For example, reserved parameters in standard read and write commands can be used as the non-blocking coherent re-write process read/write flags, as shown FIGS. 5 and 6. Of course, this is just an example, and other implementations of the read/write flags can be used.

There are several advantages associated with these embodiments. One advantage is that these embodiments can be used to maintain logical and physical mapping coherency in the host 300 and storage system 100, thereby providing high read performance and low write amplification.

Finally, as mentioned above, any suitable type of memory can be used. Semiconductor memory devices include volatile memory devices, such as dynamic random access memory ("DRAM") or static random access memory ("SRAM") devices, non-volatile memory devices, such as ReRAM, electrically erasable programmable read only memory ("EEPROM"), flash memory (which can also be considered a subset of EEPROM), ferroelectric random access memory ("FRAM"), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional (2D) memory structure or a three dimensional (3D) memory structure.

In a 2D memory structure, the semiconductor memory elements are arranged in a single plane or a single memory device level. Typically, in a 2D memory structure, memory elements are arranged in a plane (e.g., in an x-z direction plane) that extends substantially parallel to a major surface of a substrate that supports the memory elements. The substrate may be a wafer over or in which the layer of the memory elements is formed or it may be a carrier substrate that is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A 3D memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements in each column. The columns may be arranged in a 2D configuration, e.g., in an x-z plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the 2D and 3D structures described but cover all relevant memory structures within the spirit and scope of the invention as described herein and as understood by one of skill in the art.

It is intended that the foregoing detailed description he understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:

1. A storage system comprising:
a memory; and
a controller coupled to the memory and configured to:
in response to receiving a read command from a host to read data stored at a logical block address of the memory:
read the data from the memory; and
store a representation of a portion of a logical-to-physical address table that contains an entry for the logical block address; and
in response to receiving a write command from the host to write the data back to the memory:
compare the representation with a current version of the portion of the logical-to-physical address table that contains the entry for the logical block address; and
write the data back to the memory only in response to the representation matching the current version.

2. The storage system of claim 1, wherein the controller is further configured to receive information from the host that causes the controller to store the representation in the memory and compare the representation with the current version.

3. The storage system of claim 1, wherein the read command comprises a first flag configured to cause the controller to store the representation in the memory, and wherein the write command comprises a second flag configured to cause the controller to compare the representation with the current version.

4. The storage system of claim 3, wherein the first flag is stored in a reserved parameter in the read command.

5. The storage system of claim 3, wherein the second flag is stored in a reserved parameter in the write command.

6. The storage system of claim 3, wherein the first flag comprises a non-blocking coherent re-write process read flag, and wherein the second flag comprises a non-blocking coherent re-write process write flag.

7. The storage system of claim 1, wherein the data is read by the controller from non-sequential physical addresses in the memory and is written back by the controller to sequential physical addresses in the memory.

8. The storage system of claim 1, wherein the controller is further configured to update the logical-to-physical address table after writing the data back to the memory.

9. The storages system of claim 1, wherein the controller is further configured to store the representation in the memory and compare the representation with the current version in response to a fragmentation level of the data being above a threshold.

10. The storages system of claim 1, wherein the controller is further configured to not write the data back to the memory in response to the representation not matching the current version.

11. The storage system of claim 1, wherein the read and write commands are of a fixed size.

12. The storage system of claim 1, wherein joint synchronized processes on the host and the controller are configured to cause the data to be written back to the memory only in response to the representation matching the current version.

13. The storage system of claim 1, wherein the memory comprises a three-dimensional memory.

14. In a host in communication with a storage system comprising a memory, a method comprising:
sending a read command to the storage system to read data at a logical block address of the memory, wherein the read command comprises a first flag configured to cause the storage system to take a snapshot of a segment of a logical-to-physical address table that is relevant to the logical block address; and
sending a write command to the storage system to write the data back to the memory, wherein the write command comprises a second flag configured to cause the storage system to compare the snapshot with a current version of the segment of the logical-to-physical address table and write the data back to the memory only in response to the snapshot matching the current version.

15. The method of claim 14, wherein the first flag is stored in a reserved parameter in the read command.

16. The method of claim 14, wherein the second flag is stored in a reserved parameter in the write command.

17. The method of claim 14, wherein the first flag comprises a non-blocking coherent re-write process read flag, and wherein the second flag comprises a non-blocking coherent re-write process write flag.

18. The method of claim 14, wherein the read and write commands are of a fixed size.

19. The method of claim 14, wherein joint synchronized processes on the host and the storage system cause the data to be written back to the memory only in response to the snapshot matching with the current version.

20. A storage system comprising:
 a memory; and
 means for executing a received write command to write data back to the memory after the data was previously read from the memory, wherein the data is written back to the memory only in response to a portion of a logical-to-physical address table that contains an entry for a logical block address for the data being unchanged from when the data was read from the memory.

* * * * *